July 26, 1938. J. V. HORR 2,125,111
KNOCK-DOWN DISPLAY DEVICE
Filed May 25, 1933 3 Sheets-Sheet 1
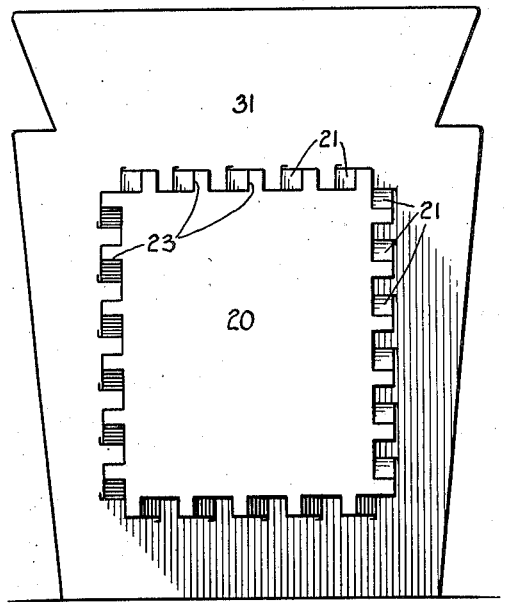
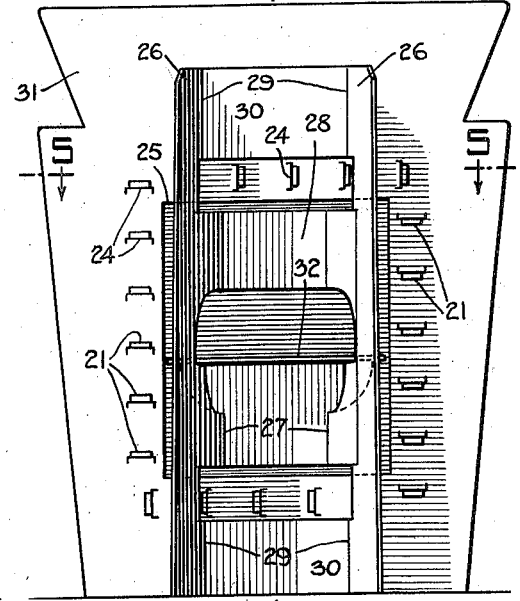
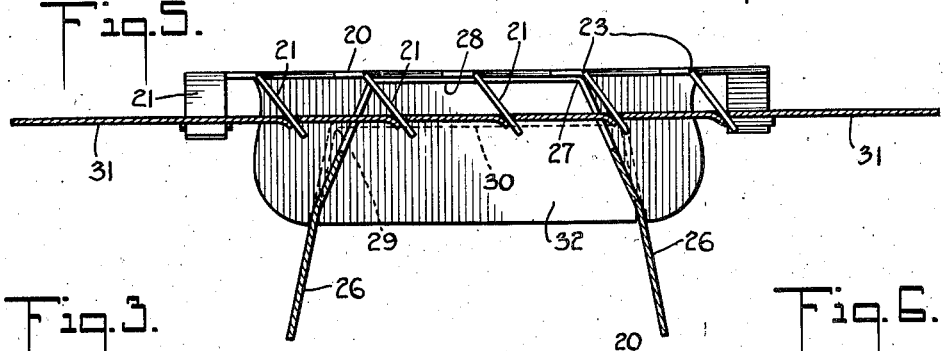
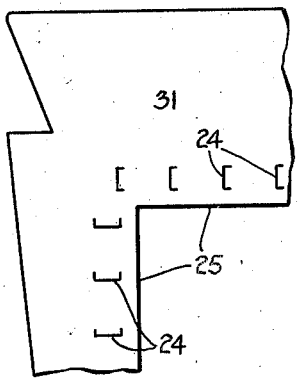
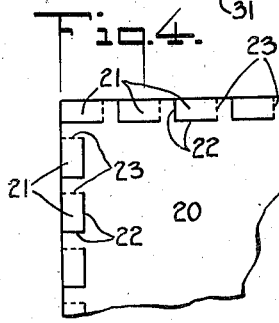
INVENTOR
John V. Horr
BY
Gluck & Breitenfeld
ATTORNEYS July 26, 1938.　　　　　J. V. HORR　　　　　2,125,111
KNOCK-DOWN DISPLAY DEVICE
Filed May 25, 1933　　　3 Sheets-Sheet 2
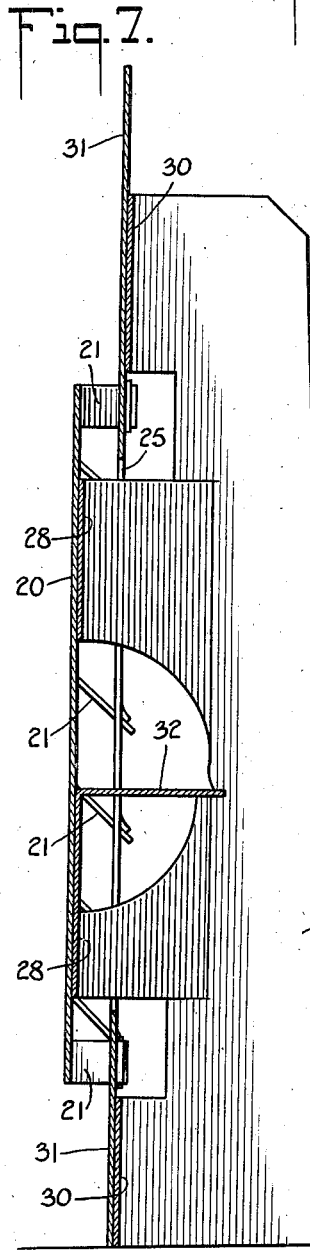
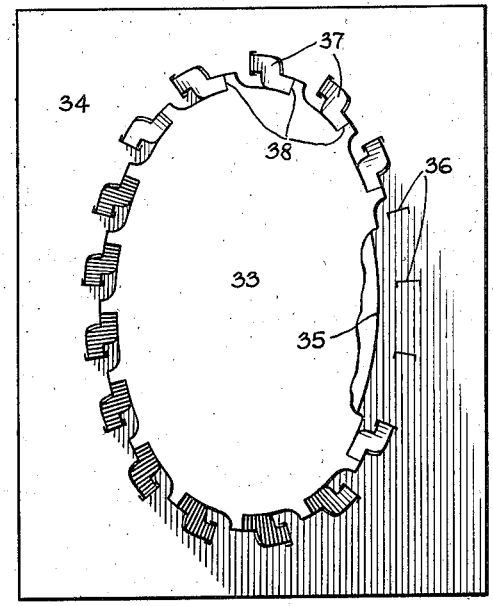
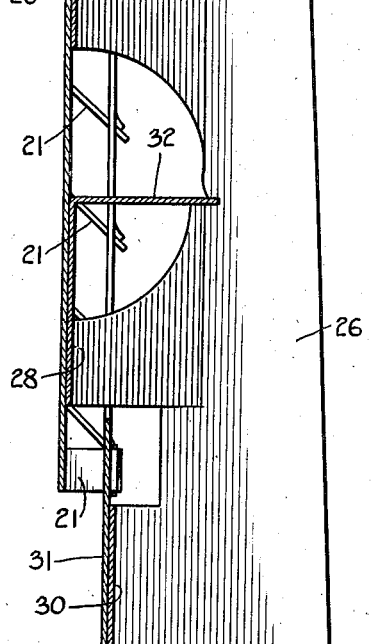
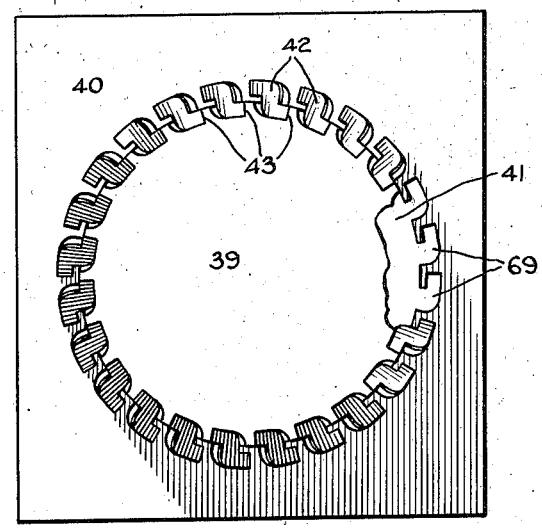
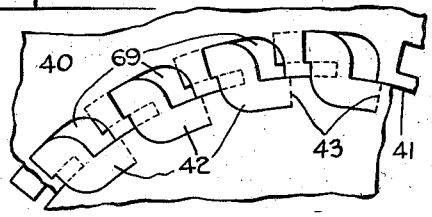
INVENTOR
John V. Horr
BY
ATTORNEYS July 26, 1938.  J. V. HORR  2,125,111
KNOCK-DOWN DISPLAY DEVICE
Filed May 25, 1938   3 Sheets-Sheet 3
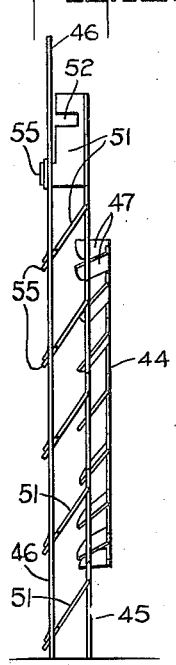
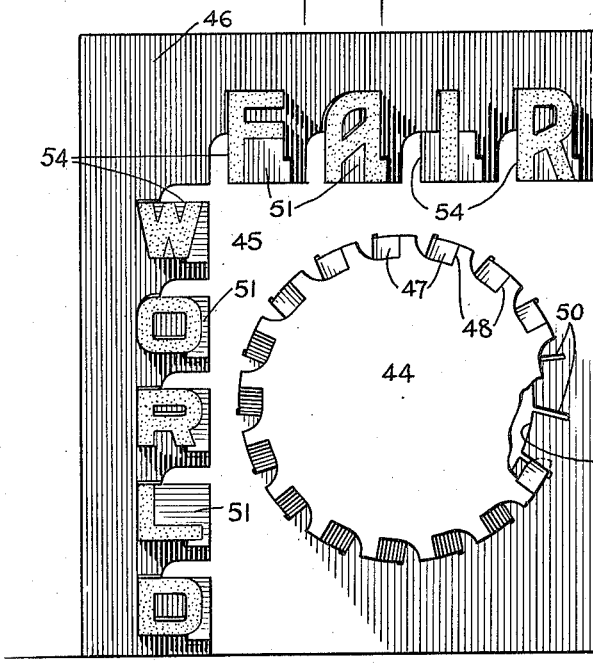
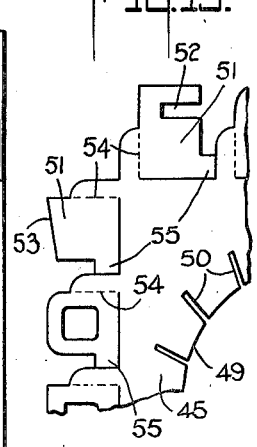
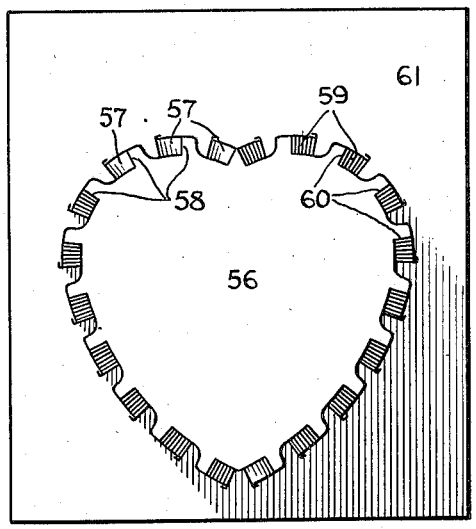
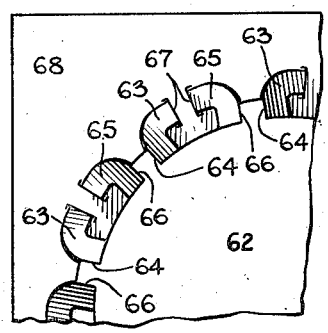
INVENTOR
John V. Horr
BY
Gluck + Breitenfeld
ATTORNEYS Patented July 26, 1938

2,125,111

UNITED STATES PATENT OFFICE 2,125,111

KNOCK-DOWN DISPLAY DEVICE

John V. Horr, Hastings on Hudson, N. Y., assignor to Einson-Freeman Co., Inc., Long Island City, N. Y., a corporation of Delaware Application May 25, 1938, Serial No. 209,912

15 Claims. (Cl. 40—126)

My present invention relates generally to display devices, and has particular reference to an improved type of knock-down advertising display or the like.

The present device is of the general type which is primarily intended to be constructed at relatively low expense from elements of cardboard, stiff paper, or the like, although it will be understood that certain phases of my invention do not necessarily restrict its use to cardboard or its equivalents.

A general object of the invention is to provide an improved device of the character in which the display, when set up, includes at least two complementary display areas arranged in offset planes, the region between the areas being of louvered character. While the display areas need not necessarily be so arranged, nevertheless it is generally preferable that one of the areas serve as a sort of border for the other.

I am aware of previous constructions of generically similar kind, as shown, for example, in the Paige patent, #2,113,432, and in the Beckelman patent, #2,080,997. In each of those patents, the main objective seems to have been to construct the display portion of the device of a single element of cardboard or the like, the intention being, no doubt, to simplify manufacture and reduce cost.

I have found that the employment of a single blank is not always of advantage, and may actually make the process of manufacture more difficult and costly. This is especially so where a scoring is required on both sides. Moreover, the use of a single blank imposes severe limitations upon the general nature of the device. For example, it restricts the display areas to certain shapes, it requires that the louvers of any one panel shall all face in only one direction, and it necessitates a special and undesirable rotation or shifting movement of one display area relative to another when the device is to be set up. Also, where the louvers are to form an ornamental panel around a non-circular display area, it is impossible to make the panel louvered throughout its entire length.

In accordance with my present invention, the foregoing illustrative disadvantages are successfully obviated, scoring is required on one side only, and the display may partake of any desired shape. The louvers need not necessarily always face in the same direction, a complete louvered border is always possible of accomplishment, and innumerable variations in shapes and arrangements of display areas and in configurations of louvers may be provided for.

Of primary importance is the fact that the present improved construction requires no rotative nor shifting movement of one display area relative to another, and because of this, increased simplicity, and enhanced symmetry, are achieved.

The present construction is characterized by the employment of at least two entirely separate blanks. One of the blanks includes a panel that is cut and scored to define a succession of hinged louvers; while the other blank is provided with apertures slidably accommodating the free ends of the louvers. In this way, a pure rectilinear separation of the blanks into spaced relation will automatically slide the louvers into spaced transverse planes.

Another characterizing feature of my invention lies in the provision of an improved means for engaging the display areas at the rear in order to control their relative movements in a non-rotative, non-shifting manner.

I achieve the foregoing objects and such other objects and advantages as may hereinafter appear or be pointed out, in the manner illustratively exemplified in the accompanying drawings in which—

Figure 1 is a front elevational view of a display device embodying the features of the present invention, the device being shown in set up position, Figure 2 is a rear view of Figure 1, Figure 3 is a fragmentary plan view of one of the blanks entering into the construction of the device of Figure 1, Figure 4 is a similar fragmentary plan view of the other blank entering into the construction of the device of Figure 1, Figure 5 is an enlarged cross-sectional view taken substantially along the line 5—5 of Figure 2, Figure 6 is a fragmentary view similar to Figure 5 showing the manner in which the device is collapsed and set up, Figure 7 is an elevational cross-sectional view taken substantially along the line 7—7 of Figure 2, Figure 8 is a front elevational view of a modified construction with a portion broken away, Figure 9 is a view similar to Figure 8 showing a further modification, Figure 10 is an enlarged fragmentary view of the device of Figure 9 in collapsed condition, Figure 11 is an elevational front view of a further modification with portions broken away, Figure 12 is an end view taken from the left of Figure 11 with the prop element omitted for the sake of clearness, Figure 13 is a fragmentary plan view of one of the blanks entering into the construction of the device of Figure 11, Figure 14 is a view similar to Figures 8 and 9 showing a further modification, and Figure 15 is a fragmentary view similar to Figure 14 showing a further modification.

By way of illustration, I have shown in Figures 1–7, a display device in which there is a rectangular display area 20 surrounded by a border area 31, these two areas being separated by a complete rectangular panel of louvered character.

In the illustrated embodiment, the louvers are formed on the display area 20 as shown most clearly in Figure 4. The louvers, in this case, are substantially rectangular and are designated by the reference numeral 21. Each one is produced by two cuts 22 and by a scoring 23. It will be observed that the scorings 23, which define the hinge lines of the louvers, are arranged transversely to the longitudinal axis of each louvered panel.

The production of the blank of Figure 4 is a relatively simple manufacturing step, requiring a scoring on only one side.

The other blank entering into the device of Figure 1 is shown in Figure 3. It may obviously have any external contour that may be desired. It is provided with a series of apertures 24 which are so arranged that they may slidably accommodate the free ends of the louvers 21 when one blank is properly superposed upon the other. The blank 31 is also provided with a medial opening 25 which has been shown of rectangular form, and which lies behind the display area 20 when the parts are assembled, thereby permitting access to the rear surface of the blank 20 for purposes of controlling the movements of the latter.

When the two blanks of Figures 3 and 4 are first assembled, the parts assume the relationships shown in full lines in Figure 6. In this condition, the two blanks lie in contacting superposed relationship, producing a substantially flat compact unit which may readily be scored, packed, or shipped.

When the device is set up, the area 20 is pushed directly forwards, as indicated in dot and dash lines in Figure 6, and in full lines in Figure 5. This may be brought about by a pure rectilinear separation of the blanks into the spaced relation shown in Figure 5. By the term "pure rectilinear separation" I intend to allude to a movement, as shown most clearly in Figure 6, whereby each hinge line 23 is moved along a direction forming an angle of substantially 90° to the plane of the area 20, as distinguished from the endwise shifting which is required by the structures of the prior art.

During the separation of the two blanks, the louvers 21 slide within the apertures which accommodate them, and they are so proportioned that they never slide completely out of these apertures, but come to rest in the spaced transverse planes depicted most clearly in Figure 5.

One conventional way of bringing about the proper relative mounting of the two blanks, and the proper relative movements of these blanks, is illustrated in Figures 2, 5 and 7. A normally flat member 26, preferably of cardboard and of suitable character and strength, is provided with the spaced parallel hinge lines 27, defining attachment portions 28 between them. The member 26 is also provided with the more widely spaced pair of hinge lines 29 defining the attachment portions 30 between them. The hinge lines 29, it will be observed, are offset with respect to the hinge lines 27.

The attachment portions 28 are secured to the rear surface of the display area 20, and the attachment portions 30 are secured to the rear surface of the display area 31. This is preferably accomplished by a single gluing procedure, with all the parts, including the member 26, in substantially flat superposed relationship.

When the device is to be set up the lateral portions of the member 26 are swung into the rearwardly-projecting positions shown in the drawings, and this manipulation is sufficient to effect the desired separation of the two display areas.

In conventional manner, the member 26 may be retained in the operative display-propping position by means of the brace 32.

In Figure 8, I have illustrated the applicability of the present invention to a display device in which an elliptical display area 33 is associated with a complementary border area 34. The latter is provided with a substantially elliptical opening 35 arranged behind the area 33 to facilitate access to the rear surface of the latter for controlling its movements. The blank 34 is also provided with the series of spaced apertures 36 adapted to slidably accommodate the free ends of the hinged louvers 37 which are formed on the display area 33. I have shown these louvers of a shape conforming somewhat to the letter Z, or a crude inverted letter S. Each of the louvers is respectively hinged to the area 33 along hinge lines 38 which are transverse with respect to the longitudinal axis of the elliptical louvered panel. These hinge lines are formed by scoring, as will be understood.

In adjusting the blanks 33 and 34 into spaced relationship, it should be noted that there is not the slightest distortion of either blank, because of the sliding relationship between the louvers and the blank through which they project; and it makes no difference whether the ellipse is mildly or severely eccentric. This undistorted adjustability of the display areas cannot be accomplished so far as I am aware by any prior constructions of similar generic character.

In Figures 9 and 10, I have illustrated a modified construction showing the manner in which the invention may, if desired, be applied to a display device in which there is a circular display area 39 surrounded by a complementary border area 40. The latter is again provided with an opening 41 arranged behind the area 39, and the area 39 is provided with a series of hinged S-shaped louvers 42 connected to the area 39 along hinge lines 43. The latter are produced by scoring, and are, in this case, radial with respect to the circular area 39.

The apertures which slidably accommodate the louvers 42 are, in this case, somewhat different from the apertures heretofore illustrated and described in connection with Figures 3 and 8. These apertures are designated by the reference numeral 69, and the shape which they assume, as shown most clearly at the right of Figure 9, arises from the fact that the blanks 39 and 40 may, if desired, be produced from a single initial blank of sheet material. Thus, if a single initial blank is cut to define the louvers 42, the two blanks 39 and 40 are automatically produced by this single operation. They are then assembled in collapsed condition, as shown in Figure 10, a suitable prop being thereupon glued or otherwise secured to the backs of the two blanks 39 and 40.

By the term "S-shaped louver" as the same is used in the appended claims, it is intended to refer to louvers which are not only of real S-shape, but also louvers having the inverted S-shape shown in Figures 8, 9 and 10.

In Figures 11, 12 and 13 I have illustrated a further modification to show, merely by way of example, the manner in which a large number of variations may be resorted to, to produce all sorts of different ornamental display devices.

In the modified construction illustrated in these figures, I employ three separate blanks 44, 45 and 46. The blank 44 has been shown, for illustrative purposes, of circular shape, provided with substantially rectangular louvers 47 hinged along the score lines 48. The blank 45 is provided with the opening 49 arranged behind the area 44 and is provided with the apertures 50 which slidably accommodate the free ends of the louvers 47. These apertures are, in this case, shown in the form of substantially radial slots which communicate with the opening 49.

The blank 45 is shown, for illustrative purposes, of substantially rectangular configuration, and is itself provided with louvers 51 which extend through suitable apertures in the blank 46. These apertures are not clearly visible in the drawings but it will be understood that they may be of any suitable character, preferably of the type shown in Figure 3. It will also be understood that the blank 46 is provided with a suitable opening to permit access, from the rear, to the back of the blank 45, and to the back of the blank 44 for properly controlling the relative movements of these blanks in substantially the manner shown in connection with the element 26 of Figures 5 and 7. Such an element, in this case, would have three pairs of spaced parallel hinge lines, defining at least three attachment areas, one of which would be secured to the rear of the blank 44, another to the rear of the blank 45, and another to the rear of the blank 46.

The louvers 51 are of specially embellished character, and I have illustratively shown these louvers configured and cut to conform to letters of the alphabet. Thus, the louver 51 shown at the top of Figure 13 is cut with a notch 52 so that it lends itself readily to additional embellishment to depict the letter F. Similarly, the louver 51 at the top of the left side of the blank 45 has an inclined edge 53 adapting this louver to additional embellishment which depicts the letter W.

In the particular form which I have chosen for illustration, the louvers 51 are hinged along hinge lines 54, and the free ends 55 are relatively narrow so that the corresponding apertures in the blank 46 may be correspondingly short in length.

The louvers 51 are themselves embellished and specially configured, but it will be obvious that a slight modification might be effected to leave the louvers unembellished and uniform, and to impart special configurations to the projecting portions of the blank 45, to which the louvers 51 are hinged.

It will also be understood that the particular configurations shown in Figures 11–13 are offered merely by way of example and that the invention lends itself readily to any desired special shapes or representations.

In Figure 14 I have shown a construction in which a display area 56 is heart shaped, and in which the louvers 57, on one longitudinal side, are hinged along lines 58 so as to extend obliquely in one direction; while the louvers 59, on the other longitudinal side, are hinged along lines 60 so as to extend obliquely in the opposite direction. The free ends of the louvers 57 and 59 extend, as hereinbefore described, in slidable relation through suitable apertures in the complementary display area 61.

In Figure 15 I have illustrated a construction in which a medial display area 62, of any desired shape, is provided with louvers 63 which are hinged along lines 64, and which extend obliquely in one direction, while alternate louvers 65 are hinged along lines 66 so as to extend obliquely in the opposite direction. These louvers, as before, extend through corresponding apertures 67 in the complementary display area 68.

As will be understood by those skilled in the art, there are may possible ramifications to the invention, and it is intended that the embodiments herein illustrated and described shall be considered as being merely illustrative in character. Thus, it will be obvious that, in the first place, the display areas need not necessarily be arranged in concentric relationship; they might, for example, be side by side. In the second place, where the display areas are arranged concentrically, it need not necessarily be the medial one which is pushed forwardly relative to the outer one. In certain cases it might be desirable to have the medial area pushed rearwardly. If the louvers are on the medial area, this would require merely that they be threaded forwardly through the apertures, rather than in the rearward direction herein illustrated. Or, in the alternative, the louvers might be arranged on the border area so that the free ends would be threaded rearwardly through apertures in the medial area.

In general it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is:

1. In a knock-down display device, a pair of superposed flat blanks one of which includes a panel cut and scored to define a succession of hinged louvers, the other blank having apertures slidably accommodating the free ends of said louvers, whereby a pure rectilinear separation of the blanks into spaced relation will slide the louvers into spaced transverse planes.

2. The combination with the elements set forth in claim 1, of means engaging said blanks from the rear for controlling their relative movements.

3. The combination with the elements set forth in claim 1, of means engaging said blanks from the rear for controlling their relative movements, said means comprising a normally flat member having hinged attachment portions secured to said blanks respectively, the hinge axes of said portions being offset from one another.

4. The combination with the elements set forth in claim 1, of means engaging said blanks from the rear for controlling their relative movements, said means comprising a normally flat member having a pair of spaced parallel hinge lines defining an attachment portion between them, said member having also a pair of more-widely spaced parallel hinge lines defining another attachment portion between them, said attachment portions being secured to said blanks respectively.

5. In a knock-down display device, a pair of superposed flat blanks one of which includes a display area and a marginal panel cut and scored to define a succession of hinged louvers, the other blank having apertures slidably accommodating the free ends of said louvers, whereby a pure rectilinear separation of the blanks into spaced relation will slide the louvers into spaced transverse planes.

6. In a knock-down display device, a pair of superposed flat blanks having complementary display areas, one of said blanks having a panel cut and scored to define a succession of hinged louvers, the other blank having apertures slidably accommodating the free ends of said louvers, whereby a pure rectilinear separation of the blanks into spaced relation will slide the louvers into spaced transverse planes, said louvers being arranged between said display areas.

7. In a knock-down display device, a pair of superposed flat blanks one of which includes a display area and the other of which includes a border area for said display area, one of said blanks having a panel cut and scored to define a succession of hinged louvers, the other blank having apertures slidably accommodating the free ends of said louvers, whereby a pure rectilinear separation of the blanks into spaced relation will slide the louvers into spaced transverse planes, said louvers being arranged between said display area and said border area.

8. The combination set forth in claim 7, said louvers being formed on the blank with the display area.

9. The combination set forth in claim 7, the blank with the border area having an opening behind said display area, and means projecting through said opening and engaging said blanks from the rear for controlling their relative movements.

10. In a knock-down display device, a pair of superposed flat blanks one of which includes a non-circular display area and the other of which includes a border area for said display area, one of said blanks being provided with a succession of hinged louvers between said display and border areas, the other blank having apertures which slidably accommodate the free ends of said louvers, whereby a pure rectilinear separation of the blanks into spaced undistorted relation will slide the louvers into spaced transverse planes.

11. The combination set forth in claim 10, said louvers being formed on the blank with the display area.

12. The combination set forth in claim 6, the hinge lines of said louvers being transverse with respect to the longitudinal axis of said panel.

13. The combination set forth in claim 6, the hinge lines of said louvers being transverse with respect to the longitudinal axis of said panel, certain louvers extending from their hinge lines in a direction opposite to the other louvers.

14. In a knock-down display device, a pair of superposed flat blanks one of which includes a circular display area and the other of which includes a border area for said display area, one of said blanks being provided with a succession of S-shaped hinged louvers between said display and border areas, the other blank having apertures which slidably accommodate the free ends of said louvers, whereby a pure rectilinear separation of the blanks into spaced relation will slide the louvers into spaced transverse planes, the hinge lines of said louvers being radial with respect to said display area, whereby the two blanks may if desired be produced from a single element.

15. The combination set forth in claim 14, the louvers being formed on the blank with the circular display area.

JOHN V. HORR.